US012302779B2

(12) United States Patent
Kendall et al.

(10) Patent No.: US 12,302,779 B2
(45) Date of Patent: May 20, 2025

(54) ADAPTABLE WALK BEHIND SPREADER

(71) Applicant: Earthway Products, Inc., Bristol, IN (US)

(72) Inventors: Jeffrey D. Kendall, Laurel, MD (US); Richard Sevrey, Bristol, IN (US); Richard H. Chapman, Camillus, NY (US)

(73) Assignee: Earthway Products, Inc., Bristol, IN (US)

( * ) Notice: Subject to any disclaimer, the term of this patent is extended or adjusted under 35 U.S.C. 154(b) by 0 days.

(21) Appl. No.: 18/356,149

(22) Filed: Jul. 20, 2023

(65) Prior Publication Data

US 2023/0371422 A1 Nov. 23, 2023

Related U.S. Application Data

(63) Continuation of application No. 18/170,219, filed on Feb. 16, 2023, now Pat. No. 12,245,539, which is a continuation of application No. 17/245,193, filed on Apr. 30, 2021, now Pat. No. 12,120,974, which is a continuation of application No. 15/786,064, filed on (Continued)

(51) Int. Cl.
*A01C 17/00* (2006.01)
*A01C 15/02* (2006.01)

(52) U.S. Cl.
CPC ............ *A01C 17/008* (2013.01); *A01C 15/02* (2013.01); *A01C 17/001* (2013.01)

(58) Field of Classification Search
CPC ...... A01C 15/02; A01C 17/001; A01C 17/008
See application file for complete search history.

(56) References Cited

U.S. PATENT DOCUMENTS 332,506 A 12/1885 Eberhart
2,489,171 A * 11/1949 Balduf .................. A01C 17/00 239/665

(Continued)

FOREIGN PATENT DOCUMENTS

CN 103797951 A 2/2017
EP 0176117 A1 1/1991

(Continued)

OTHER PUBLICATIONS

International Search Report for International Patent Application No. PCT/US2015/056203 dated Jan. 11, 2016, 2 pages.

(Continued)

*Primary Examiner* — Jason J Boeckmann
(74) *Attorney, Agent, or Firm* — Hovey Williams LLP; Kameron D. Kelly

(57) ABSTRACT

An adaptable walk behind spreader for dispersing particulate material in different spread patterns. The walk behind spreader includes a spread control assembly configured to control flow of particulate material through first, second and third exit openings and onto a dispersing mechanism. The spread control assembly includes a first spread control member and a second spread control member. Movement of the first and second spread control members selectively inhibits the flow of particulate material through at least a portion of the exit openings, thereby altering the spread pattern of the particulate material dispersed from the spreader.

31 Claims, 20 Drawing Sheets

Related U.S. Application Data

Oct. 17, 2017, now Pat. No. 10,993,368, which is a continuation of application No. 14/886,183, filed on Oct. 19, 2015, now Pat. No. 9,820,430, which is a continuation-in-part of application No. 14/875,056, filed on Oct. 5, 2015, now Pat. No. 10,225,976, which is a continuation of application No. 13/919,682, filed on Jun. 17, 2013, now Pat. No. 9,198,345, which is a continuation of application No. 13/661,620, filed on Oct. 26, 2012, now Pat. No. 9,192,094.

(60) Provisional application No. 62/066,621, filed on Oct. 21, 2014, provisional application No. 61/552,030, filed on Oct. 27, 2011.

(56) References Cited

U.S. PATENT DOCUMENTS

| | | | | |
|---|---|---|---|---|
| 2,687,307 | A | 8/1954 | Austermiller | |
| 3,383,055 | A | 5/1968 | Speicher | |
| 3,682,395 | A | 8/1972 | van der Lely et al. | |
| 3,738,546 | A | 6/1973 | Speicher | |
| 3,899,138 | A | 8/1975 | van der Lely et al. | |
| 3,944,137 | A | 3/1976 | Cutchins et al. | |
| 4,106,704 | A | 8/1978 | McRoskey et al. | |
| 4,135,560 | A | 1/1979 | Eang et al. | |
| 4,136,804 | A | 1/1979 | Kinzler et al. | |
| 4,381,080 | A | 4/1983 | van der Lely et al. | |
| 4,469,210 | A | 9/1984 | Blumer | |
| 4,479,608 | A | 10/1984 | Martin | |
| 4,487,370 | A | 12/1984 | Speicher | |
| 4,511,090 | A | 4/1985 | Morgan | |
| 4,548,362 | A | 10/1985 | Doering | |
| 4,597,531 | A | 7/1986 | Kise | |
| 4,609,153 | A | 9/1986 | van der Lely | |
| 4,776,519 | A | 10/1988 | Zweegers | |
| 4,785,976 | A | 11/1988 | Bennie et al. | |
| 4,867,381 | A | 9/1989 | Speicher | |
| 4,991,781 | A | 2/1991 | Barbieri | |
| 5,145,116 | A | 9/1992 | Shaver | |
| 5,203,510 | A | 4/1993 | Courtney et al. | |
| 5,244,129 | A | 9/1993 | Poussin et al. | |
| 5,285,971 | A | 2/1994 | Havlovitz | |
| 5,287,999 | A | 2/1994 | Olsen | |
| 5,340,033 | A | 8/1994 | Whitell | |
| 5,533,677 | A | 7/1996 | McCaffrey | |
| 5,626,260 | A | 5/1997 | Waldner | |
| 5,842,648 | A | 12/1998 | Havlovitz et al. | |
| 6,047,909 | A | 4/2000 | Simpson | |
| 6,116,526 | A | 9/2000 | Bom et al. | |
| 6,138,927 | A | 10/2000 | Spear et al. | |
| 6,354,320 | B1 | 3/2002 | Kolacz | |
| 6,499,679 | B1 | 12/2002 | Woodruff et al. | |
| 6,588,685 | B2 | 7/2003 | Woodruff et al. | |
| 6,616,074 | B2 | 9/2003 | Courtney et al. | |
| 6,907,832 | B2 * | 6/2005 | Wyne .................. | A01C 17/001<br>111/130 |
| 6,921,037 | B2 | 7/2005 | Wysong et al. | |
| 6,945,481 | B2 | 9/2005 | Thompson et al. | |
| 7,063,280 | B1 | 6/2006 | Bogart et al. | |
| 7,380,734 | B2 | 6/2008 | Magnusson | |
| 7,380,735 | B2 | 6/2008 | Hayward et al. | |
| 7,837,073 | B2 * | 11/2010 | Havlovitz ............. | A01C 15/02<br>239/681 |
| 8,056,838 | B2 | 11/2011 | Conner et al. | |
| 8,066,206 | B1 | 11/2011 | Cotham | |
| 8,757,521 | B2 | 6/2014 | Cichy et al. | |
| D729,849 | S | 5/2015 | Kendall et al. | |
| D729,850 | S | 5/2015 | Kendall et al. | |
| D730,410 | S | 5/2015 | Kendall | |
| 9,038,861 | B2 | 5/2015 | Renyer et al. | |
| 9,192,094 | B2 | 11/2015 | Kendall et al. | |
| 2002/0014545 | A1 | 2/2002 | Woodruff et al. | |
| 2003/0192968 | A1 | 10/2003 | Courtney | |
| 2006/0157518 | A1 | 7/2006 | Havlovitz et al. | |
| 2008/0216918 | A1 | 9/2008 | Comardo et al. | |
| 2009/0136325 | A1 | 5/2009 | Widmer | |
| 2010/0326035 | A1 | 12/2010 | Schrattenecker | |
| 2011/0008220 | A1 | 1/2011 | Fleming et al. | |
| 2011/0309170 | A1 | 12/2011 | Weeks | |
| 2012/0018546 | A1 | 1/2012 | Conner et al. | |
| 2013/0105592 | A1 | 5/2013 | Kendall et al. | |
| 2018/0106382 | A1 | 4/2018 | Dubiel et al. | |

FOREIGN PATENT DOCUMENTS

| | | | |
|---|---|---|---|
| EP | 0540889 | B2 | 7/1998 |
| EP | 0982223 | A2 | 8/1999 |
| FR | 1178177 | A | 5/1959 |
| JP | 4008635 | B2 | 11/2007 |
| JP | 6253144 | B2 | 7/2015 |
| KR | 20100103281 | A * | 9/2010 |
| WO | 1983000978 | A1 | 3/1983 |

OTHER PUBLICATIONS

Written Opinion of the International Searching Authority for International Patent Application No. PCT/US2015/056203, dated Jan. 11, 2016, 5 pages.
Non-final Office Action dated Dec. 21, 2023 for related U.S. Appl. No. 17/245,193, filed Apr. 30, 2021, 32 pages.
Response filed Feb. 9, 2024 to non-final Office Action dated Dec. 21, 2023 for related U.S. Appl. No. 17/245,193, filed Apr. 30, 2021, 13 pages.

* cited by examiner

ADAPTABLE WALK BEHIND SPREADER

CROSS REFERENCE TO RELATED APPLICATIONS

This application is a continuation of U.S. patent application Ser. No. 18/170,219, entitled "PARTICULATE MATERIAL DISPERSING APPARATUS WITH SHUT-OFF ADJUSTMENT PLATE," filed on Feb. 16, 2023; which is a continuation of U.S. patent application Ser. No. 17/245,193, entitled "SPREAD CONTROL MECHANISM," filed on Apr. 30, 2021; which is a continuation of U.S. patent application Ser. No. 15/786,064, entitled "SPREAD CONTROL MECHANISM," filed on Oct. 17, 2017, and issued on May 4, 2021 as U.S. Pat. No. 10,993,368; which is a continuation of U.S. patent application Ser. No. 14/886,183, entitled "SPREAD CONTROL MECHANISM," filed on Oct. 19, 2015, and issued on Nov. 21, 2017 as U.S. Pat. No. 9,820,430; which claims the benefit of U.S. Provisional Patent Application Ser. No. 62/066,621, entitled "SPREAD CONTROL MECHANISM," filed on Oct. 21, 2014. U.S. patent application Ser. No. 14/886,183 is also a continuation-in-part of U.S. patent application Ser. No. 14/875,056, entitled "ADAPTABLE SPREADER," filed on Oct. 5, 2015, and issued on Mar. 12, 2019 as U.S. Pat. No. 10,225,976; which is a continuation of U.S. patent application Ser. No. 13/919,682, entitled "ADAPTABLE SPREADER," filed on Jun. 17, 2013, and issued on Dec. 1, 2015 as U.S. Pat. No. 9,198,345; which is a continuation of U.S. patent application Ser. No. 13/661,620, entitled "ADAPTABLE SPREADER," filed on Oct. 26, 2012, and issued on Nov. 24, 2015 as U.S. Pat. No. 9,192,094; which claims the benefit of U.S. Provisional Patent Application Ser. No. 61/552,030, entitled "ADAPTABLE SPREADER," filed on Oct. 27, 2011. The entirety of the above-noted applications are incorporated by reference herein.

ORIGIN

The innovation disclosed herein relates to a particulate dispersing apparatus and, more specifically, to a granular spreader having a spread control mechanism.

BACKGROUND

A known particulate spreader incorporates a deflector that when activated impedes particulate material from exiting out one side of the spreader. Thus, any material dispersed in the spread pattern is impeded from spreading onto non-lawn areas, such as landscape beds, driveways, walkways, etc. In other words, the deflector simply deflects the dispensed material back toward the lawn area. A disadvantage of material dispersing systems that rely on such a deflector is that the amount of material dispersed (material flow rate) into the spread pattern remains the same whether or not a deflector is activated. Thus, if the deflector is activated the amount of material directed onto the lawn is more than the recommended amount since the deflected material also exits the side of the spreader opposite that of the deflector. This leads to over treatment of the lawn and to wasted product.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

Some embodiments are directed to an adaptable walk behind spreader for dispersing particulate material in different spread patterns. The walk behind spreader comprises: a frame; a push handle mounted to the frame; pair of wheels mounted to the frame; a hopper mounted to the frame and configured to hold particulate material, first, second and third exit openings through which particulate material held in the hopper can selectively pass; a spread control assembly disposed below the hopper and configured to control flow of the particulate material through the first, second and third exit openings; and a dispersing mechanism disposed below the spread control assembly and configured to disperse particulate material passing through the spread control assembly. The spread control assembly comprises a spread control mechanism that is movable between a deactivated position where none of the first, second and third exit openings are covered by the spread control mechanism and an activated position where two of the first, second and third exit openings are covered by the spread control mechanism and one of the first, second and third exit openings is not covered by the spread control mechanism. The adaptable spreader disperses particulate material in an unaltered spread pattern when the spread control mechanism is in the deactivated position and in an altered spread pattern when the spread control mechanism is in the activated position. The unaltered spread pattern disperses the particulate material to first and second opposite sides of the spreader, while the altered spread pattern impedes dispersion of the particulate material to the first side of the spreader and disperses the particulate material to the second side of the spreader.

Other embodiments are directed to an adaptable walk behind spreader comprising: a frame; a push handle mounted to the frame; a pair of wheels mounted to the frame; a hopper mounted to the frame and configured to hold particulate material; a shut-off adjustment plate attached to an outside bottom of the hopper and defining first, second and third exit openings; a first paddle attached to the shut-off adjustment plate and movable relative to the shut-off adjustment plate between a first deactivated position where the first exit opening is not covered by the first paddle and a first activated position where the first exit opening is covered by the first paddle; and a dispersing mechanism disposed below the shut-off adjustment plate and the first paddle and configured to disperse particulate material passing through the first, second and third exit openings. The first paddle comprises a handle for facilitating movement of the first paddle between the deactivated and activated positions. Movement of the first paddle from the deactivate position to the activated position alters the spread pattern of the particulate material dispersed from the spreader.

Still other embodiments are directed to an adaptable walk behind spreader comprising: a frame; a push handle mounted to the frame; a pair of wheels mounted to the frame; a hopper mounted to the frame and configured to hold particulate material; first, second and third exit openings through which particulate material held in the hopper can selectively pass; a spread control assembly disposed below the hopper and configured to control flow of the particulate material through the first, second and third exit openings; and a dispersing mechanism disposed below the spread control assembly and configured to disperse particulate material passing through the spread control assembly. The spread control assembly comprises a first spread control member and a second spread control member. The first spread control member is moveable between a fully open position where at least one of the first, second and third exit openings is not covered by the first spread control member and a fully closed position where at least one of the first, second and third exit openings is covered by the first spread control member. The second spread control member is moveable relative to the first spread control member between a deactivated position where none of the first, second and third exit openings are covered by the second spread control member and an activated position where at least one of the first, second and third exit openings is covered by the second spread control member and at least one of the first, second and third exit openings is not covered by the second spread control member. The spreader disperses particulate material in an unaltered spread pattern when the second spread control member is in the deactivated position and in an altered spread pattern when the second spread control member is in the activated position. The unaltered spread pattern disperses the particulate material to first and second opposite sides of the spreader, while the altered spread pattern impedes dispersion of the particulate material to the first side of the spreader and disperses the particulate material to the second side of the spreader.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1A:
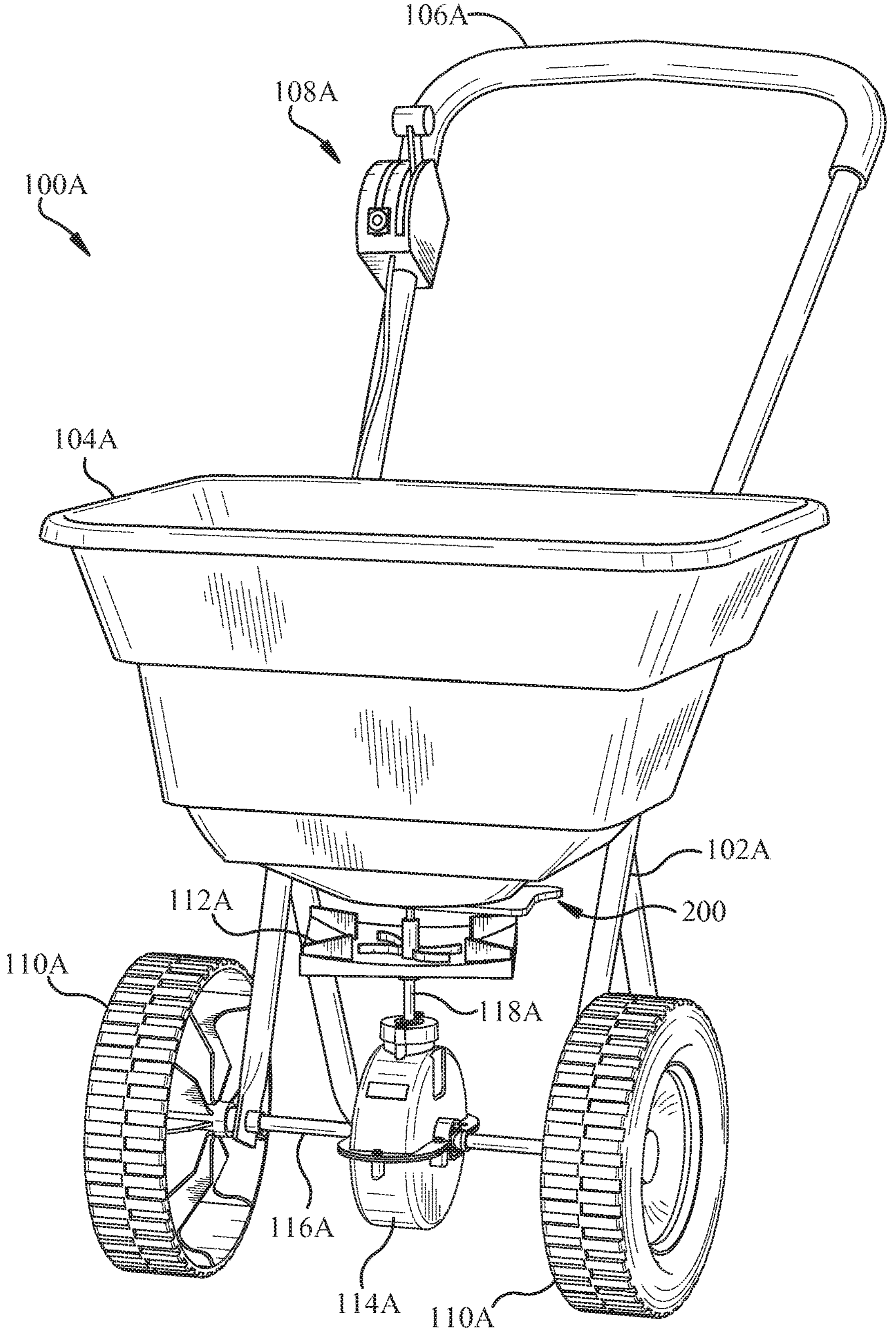
FIG. 1A is a perspective view of an example particulate dispensing apparatus featuring the innovation disclosed herein in accordance with the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein (e.g., thickness), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Disclosed herein is an innovative spread control assembly for use on a particulate dispersing apparatus that when activated impedes particulate material from being dispersed out one side of the particulate apparatus in accordance with an aspect of the innovation. When activated, the assembly overcomes the aforementioned disadvantage by simultaneously regulating a material flow rate of the particulate material, which impedes over treatment of the lawn and wasted material. Thus, the spread control assembly facilitates the reduction of particulate material that is dispersed onto non-lawn areas (e.g., landscape beds, driveways, etc.) while simultaneously regulating the material flow rate.

Figure 1B:
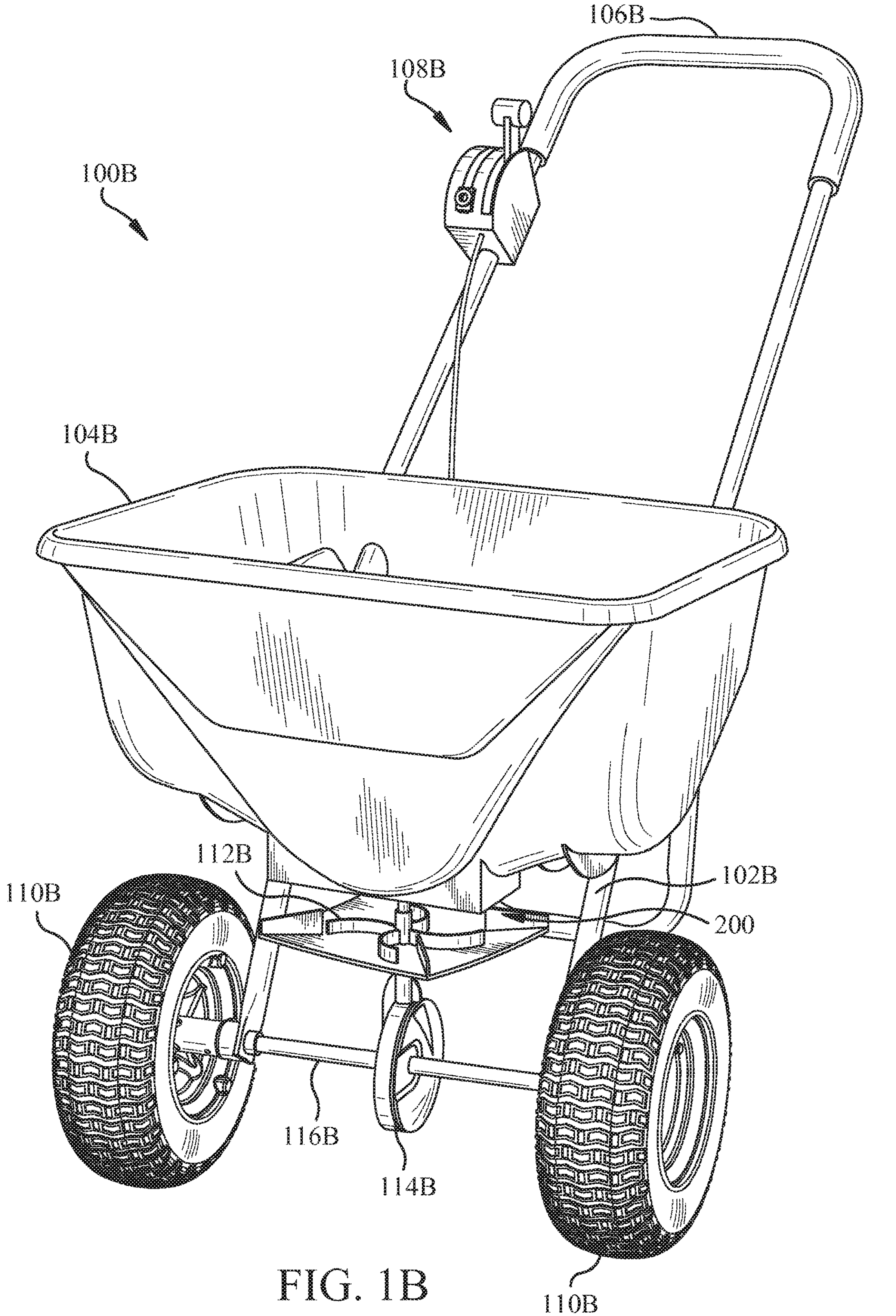
FIG. 1B is a perspective view of another example particulate dispensing apparatus featuring the innovation disclosed herein in accordance with the innovation.
Figure 2:
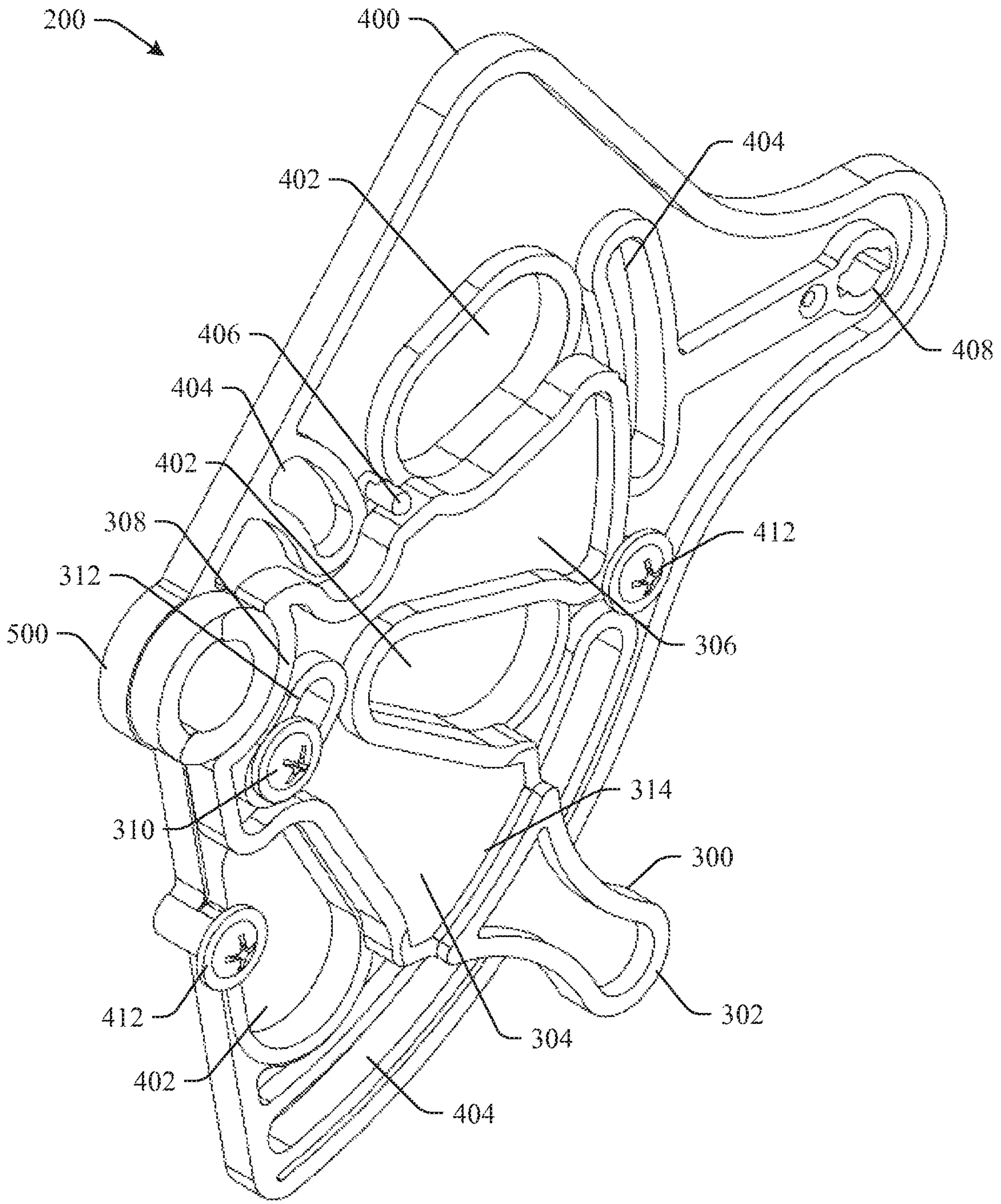
FIG. 2 is a bottom perspective view of an innovative spread control assembly in a deactivated position in accordance with an aspect of the innovation.
Figure 3:
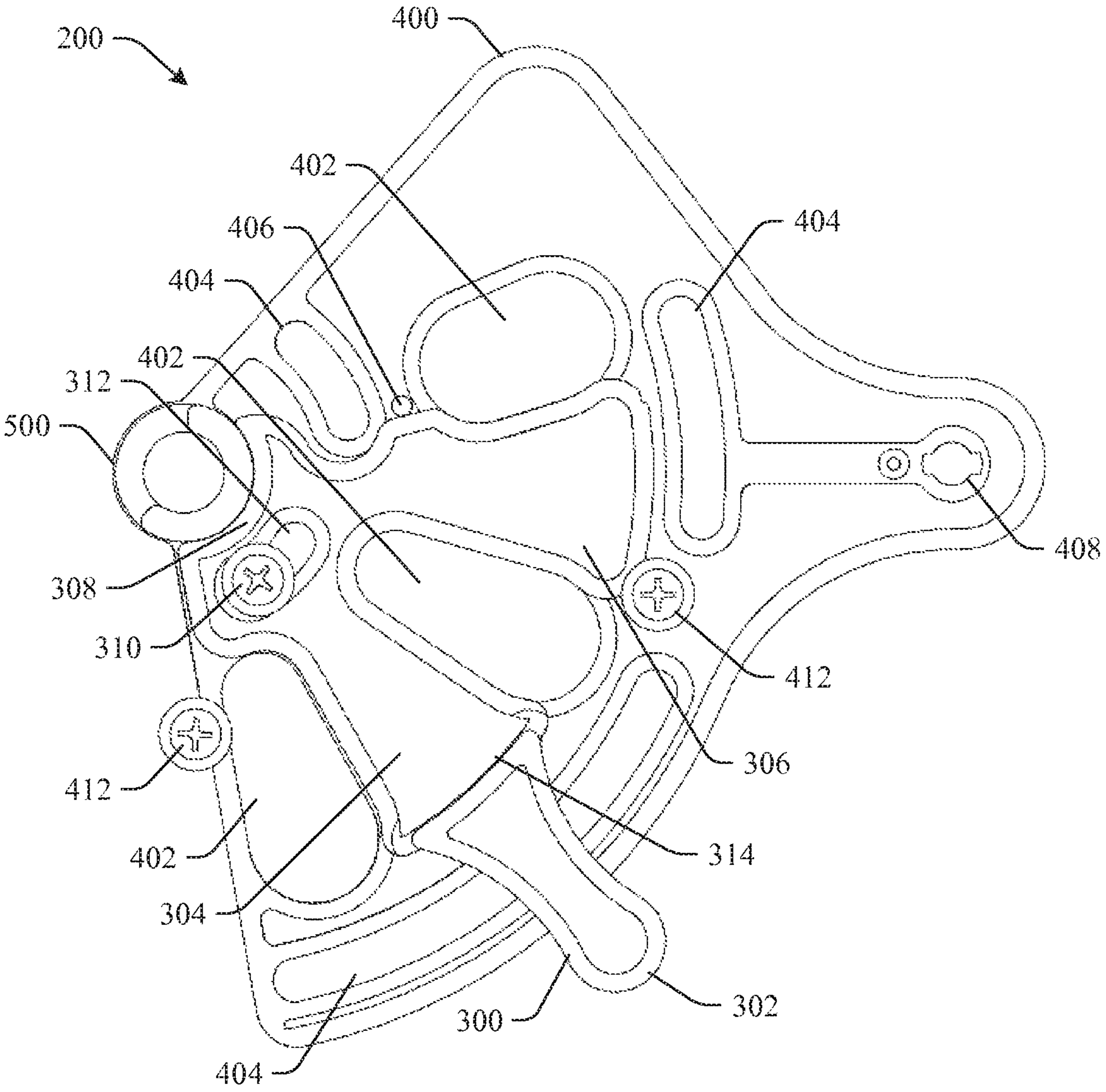
FIG. 3 is a bottom view of the innovative spread control assembly in a deactivated position in accordance with an aspect of the innovation.
Figure 4:
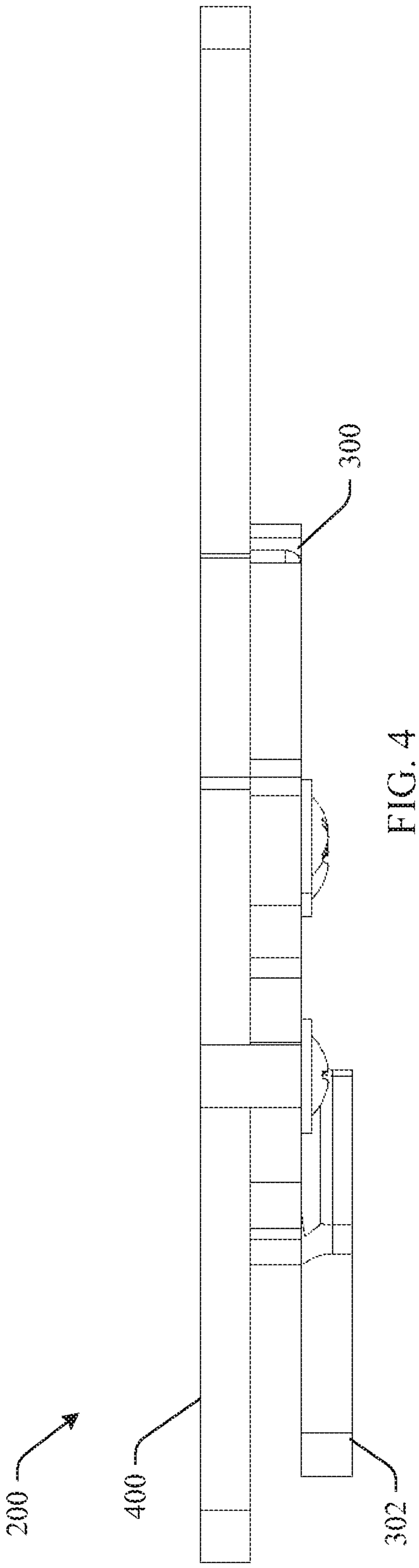
FIG. 4 is a front view of the innovative spread control assembly in a deactivated position in accordance with an aspect of the innovation.
Figure 5:
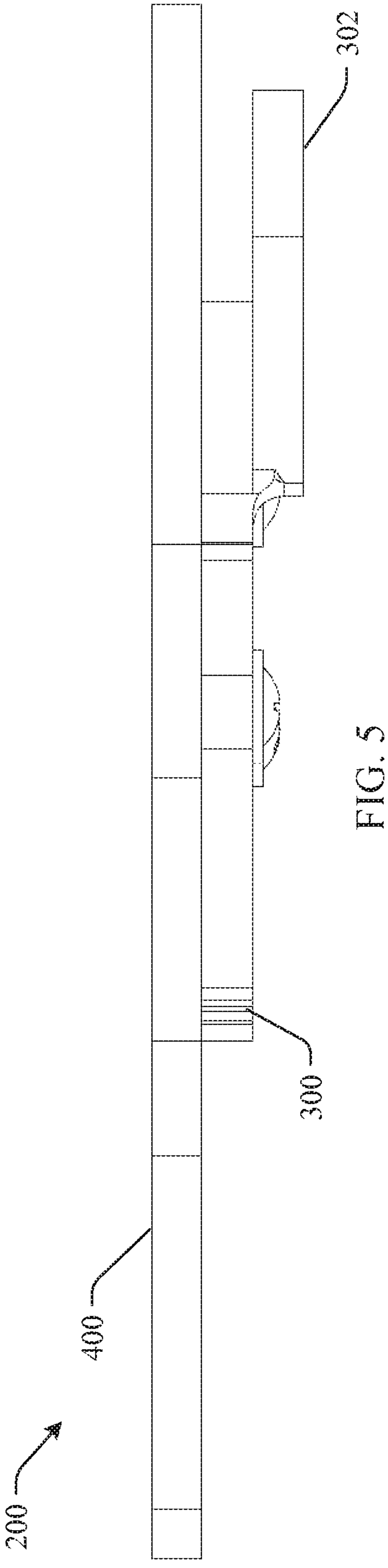
FIG. 5 is a rear view of the innovative spread control assembly in a deactivated position in accordance with an aspect of the innovation.
Figure 6:
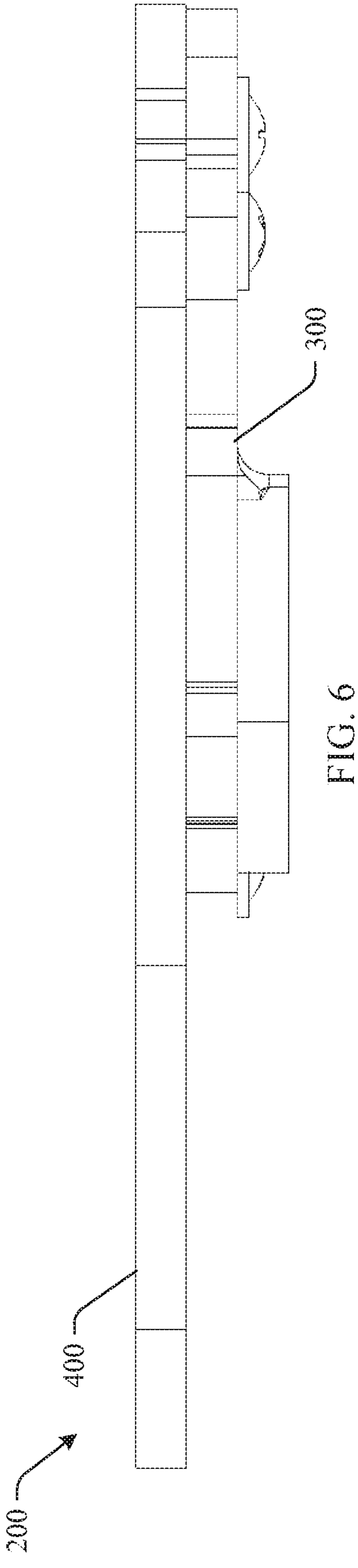
FIG. 6 is a left side view of the innovative spread control assembly in a deactivated position in accordance with an aspect of the innovation.
Figure 7:
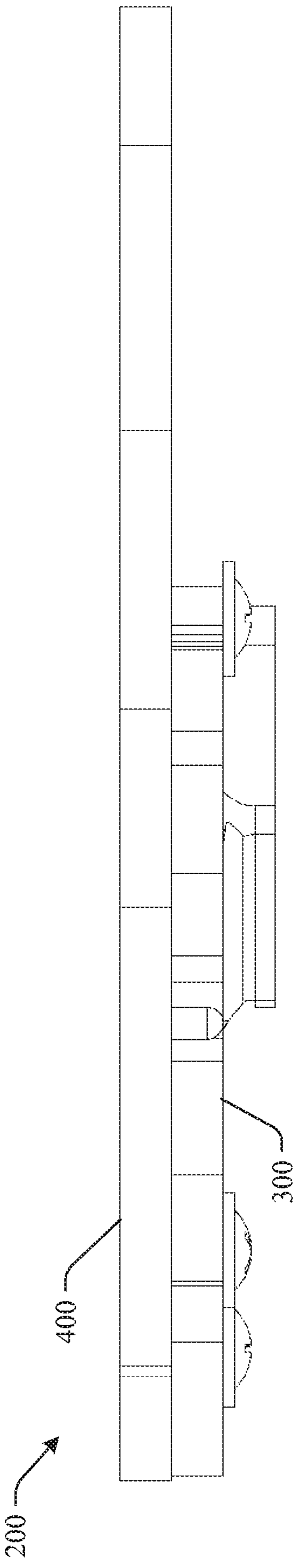
FIG. 7 is a right side view of the innovative spread control assembly in a deactivated position in accordance with an aspect of the innovation.
Figure 8:
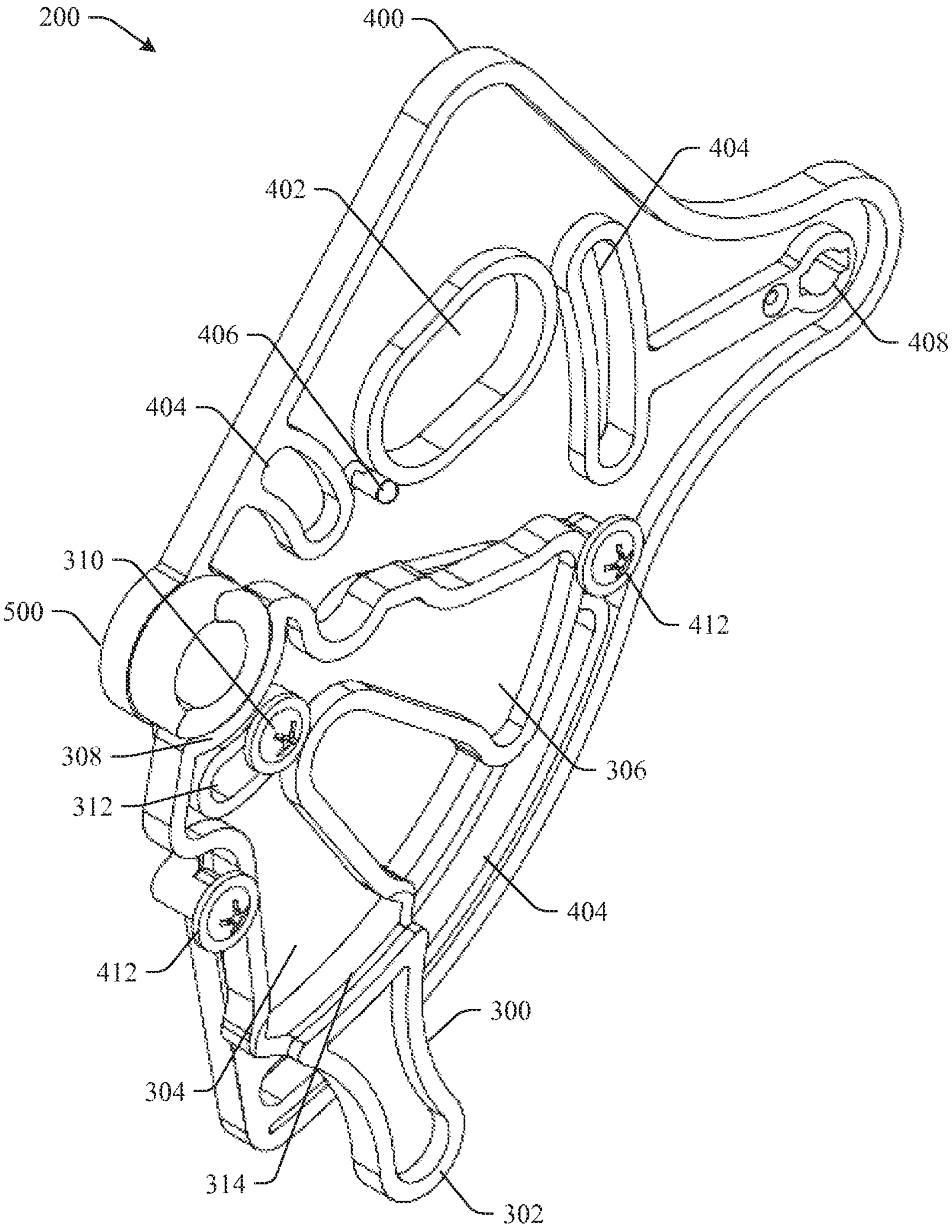
FIG. 8 is a bottom perspective view of the innovative spread control assembly in an activated position in accordance with an aspect of the innovation.
Figure 9:
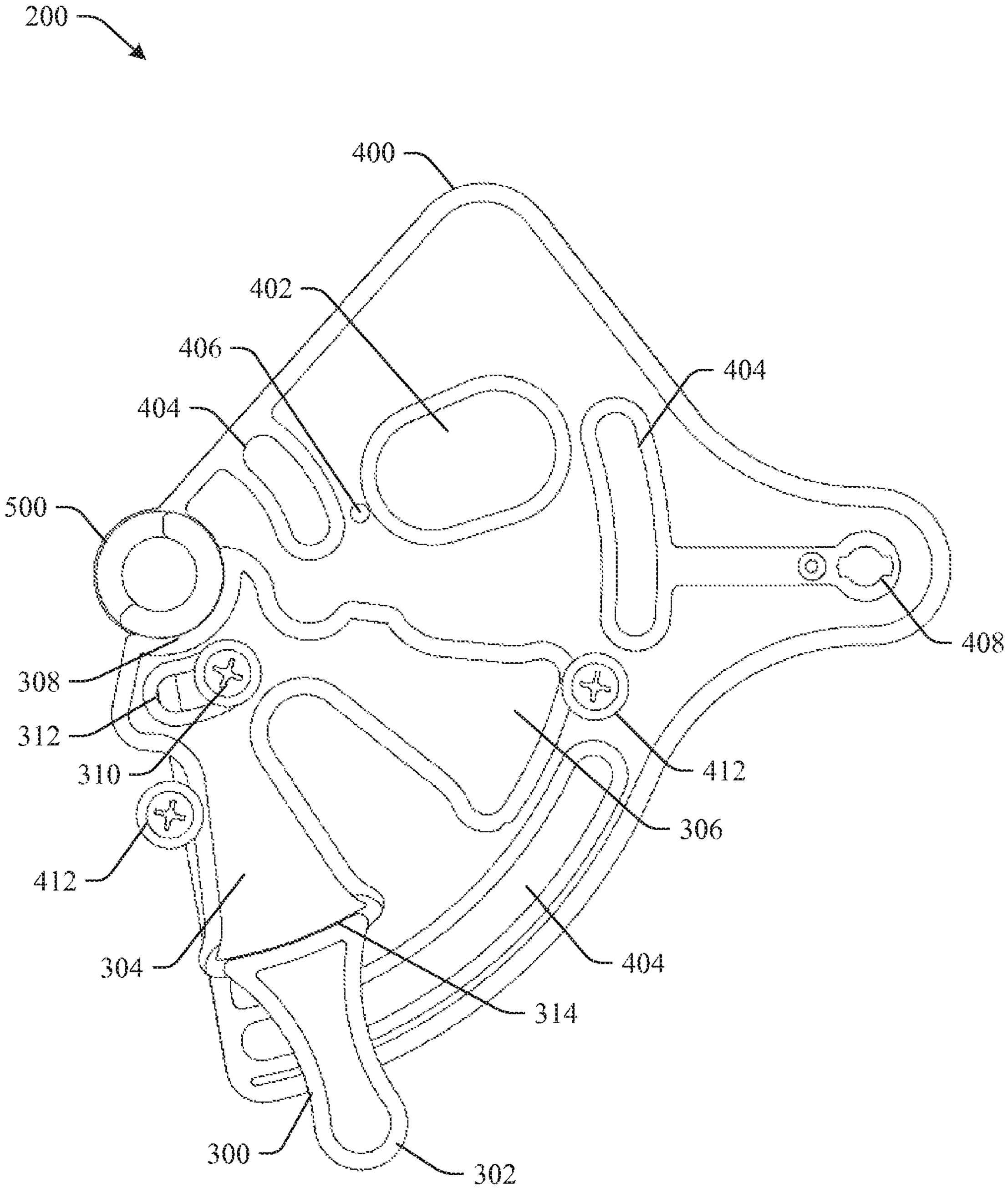
FIG. 9 is a bottom view of the innovative spread control assembly in an activated position in accordance with an aspect of the innovation.
Figure 10:
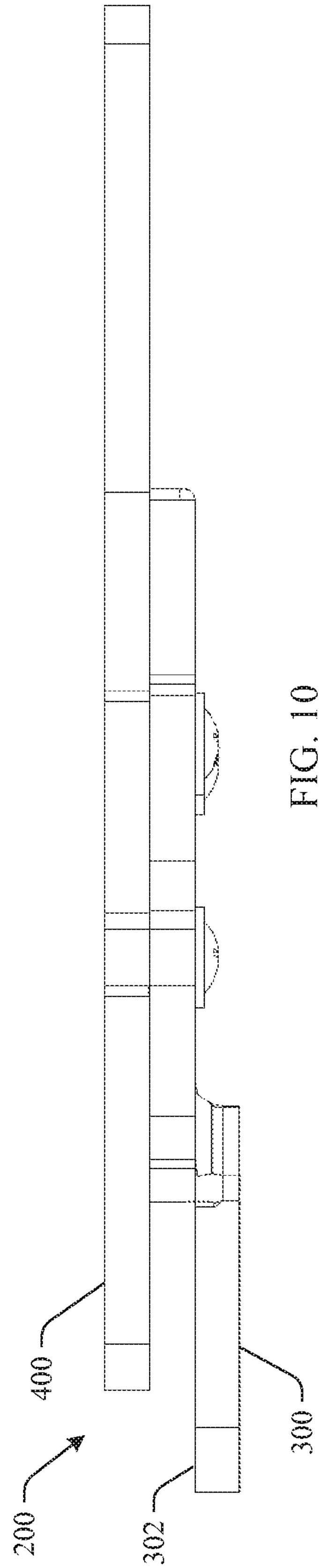
FIG. 10 is a front view of the innovative spread control assembly in an activated position in accordance with an aspect of the innovation.
Figure 11:
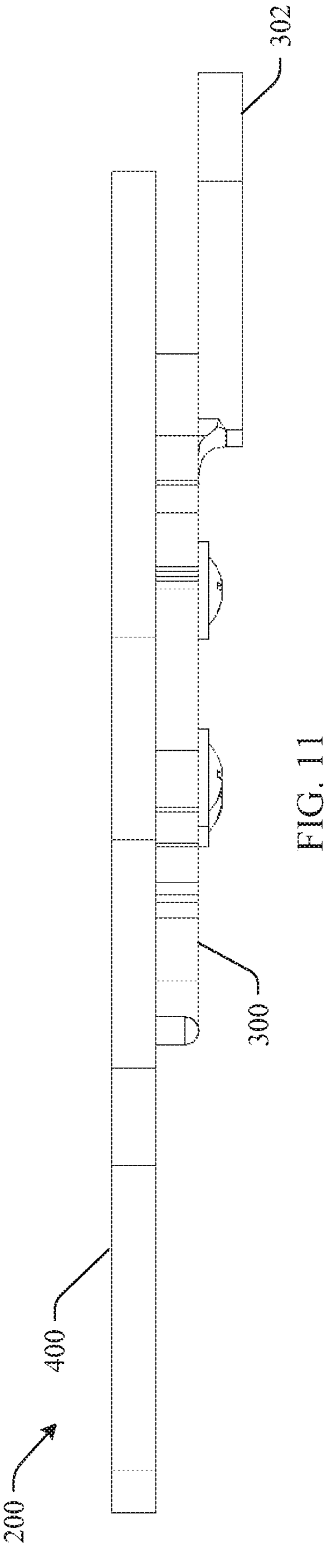
FIG. 11 is a rear view of the innovative spread control assembly in an activated position in accordance with an aspect of the innovation.
Figure 12:
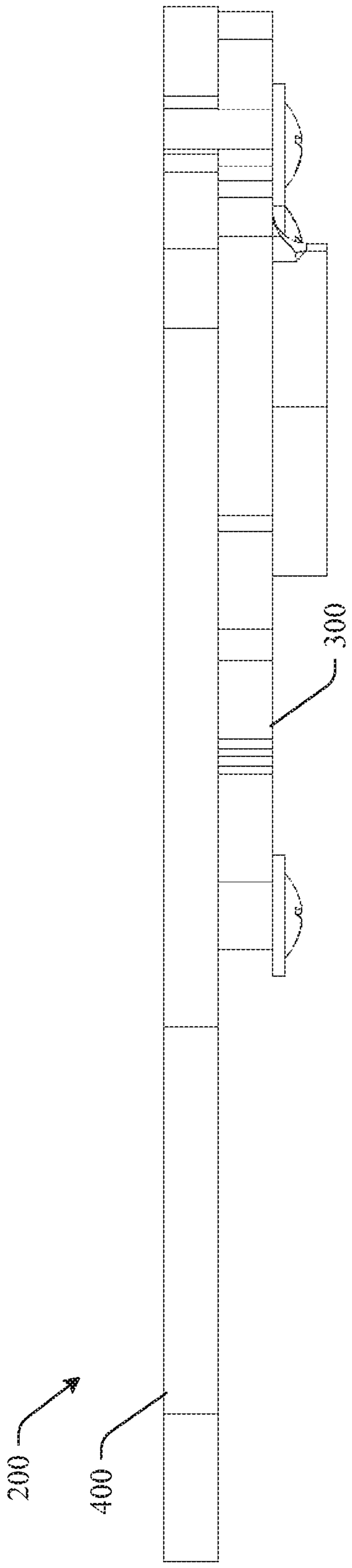
FIG. 12 is a left side view of the innovative spread control assembly in an activated position in accordance with an aspect of the innovation.
Figure 13:
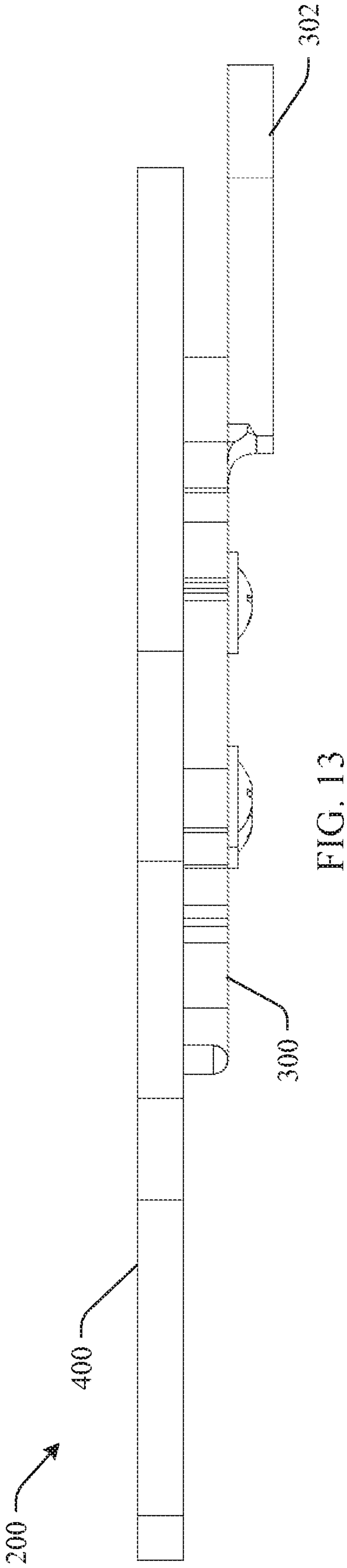
FIG. 13 is a right side view of the innovative spread control assembly in an activated position in accordance with an aspect of the innovation.
Figure 14:
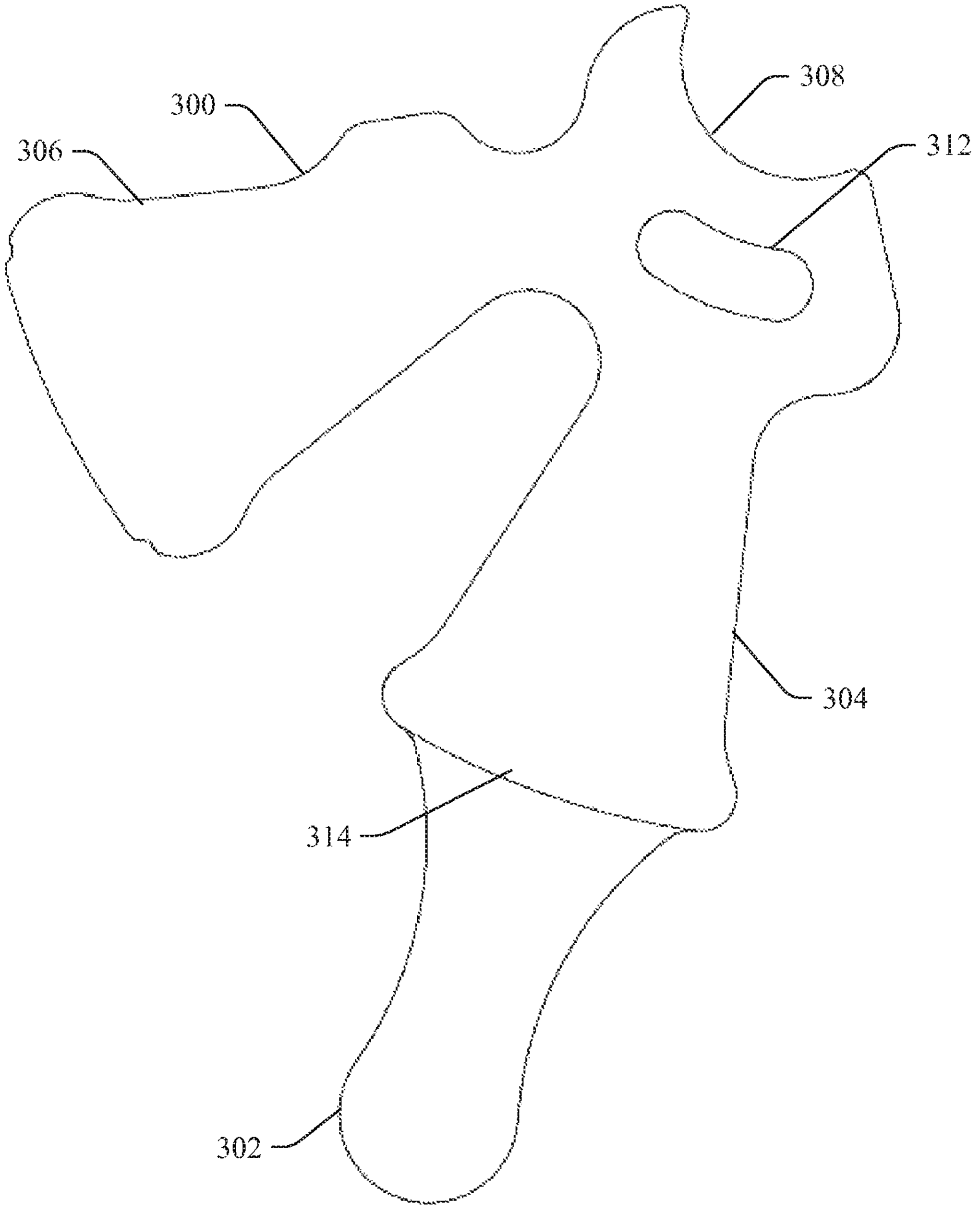
FIG. 14 is a top view of an innovative spread control mechanism in accordance with an aspect of the innovation.
Figure 15:
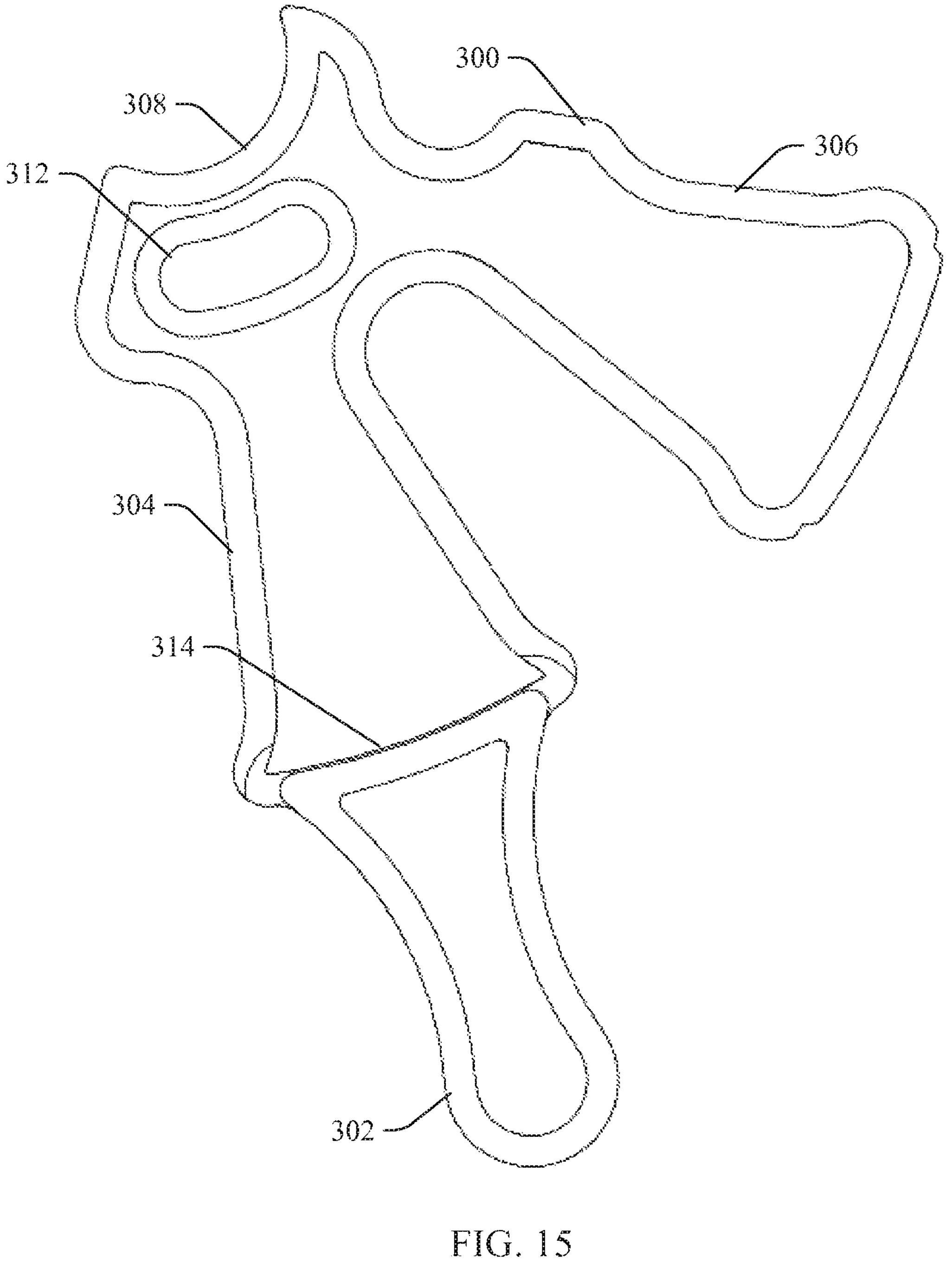
FIG. 15 is a bottom view of the innovative spread control mechanism in accordance with an aspect of the innovation.
Figure 16:
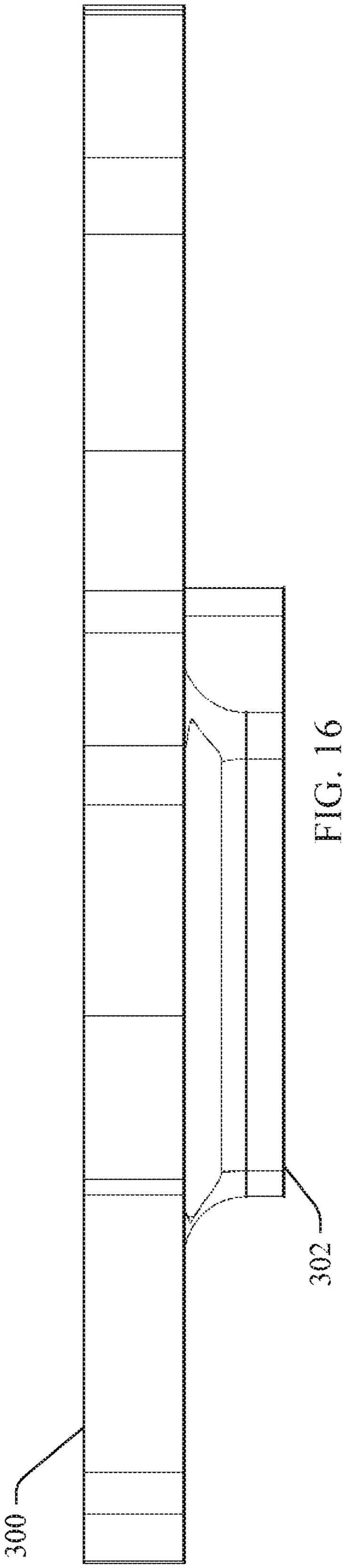
FIG. 16 is a front view of the innovative spread control mechanism in accordance with an aspect of the innovation.
Figure 17:
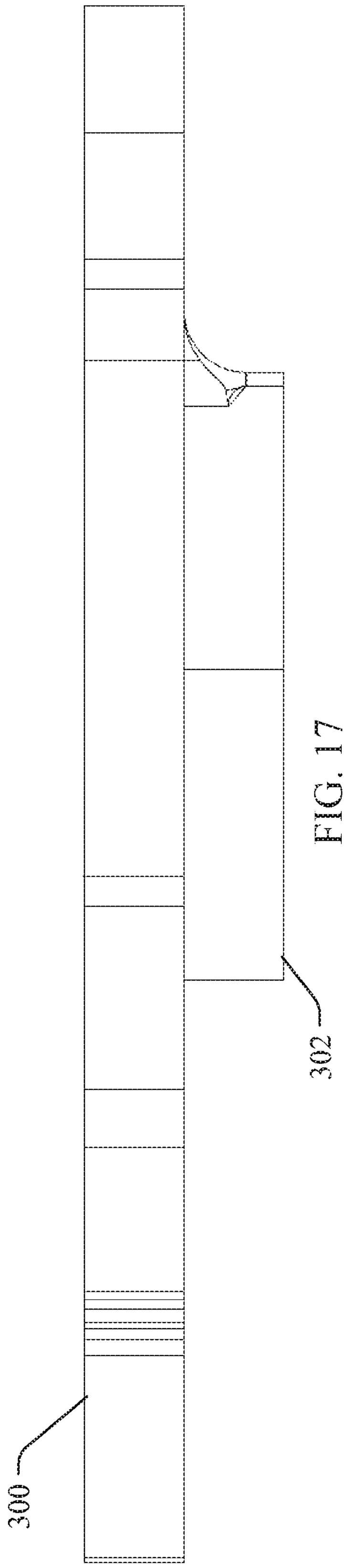
FIG. 17 is a rear view of the innovative spread control mechanism in accordance with an aspect of the innovation.
Figure 18:
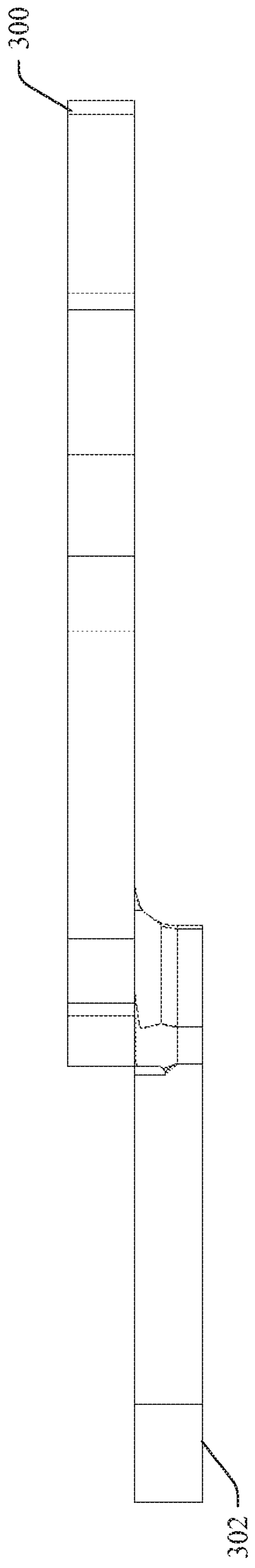
FIG. 18 is a left side view of the innovative spread control mechanism in accordance with an aspect of the innovation.
Figure 19:
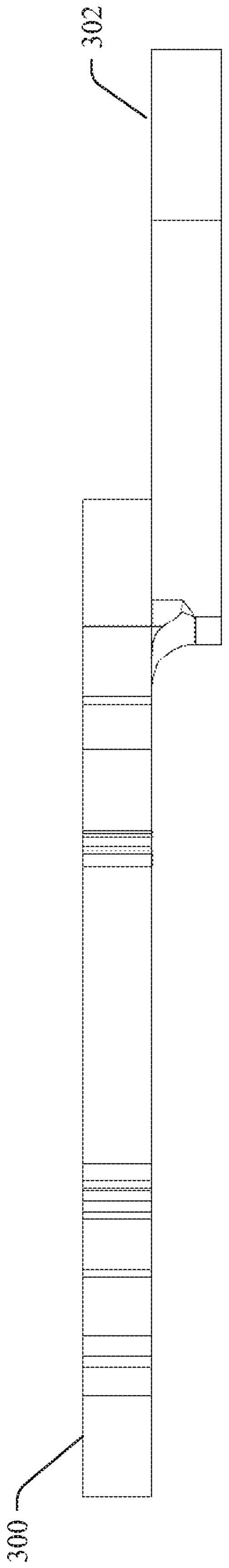
FIG. 19 is a right side view of the innovative spread control mechanism in accordance with an aspect of the innovation.
Figure 20:
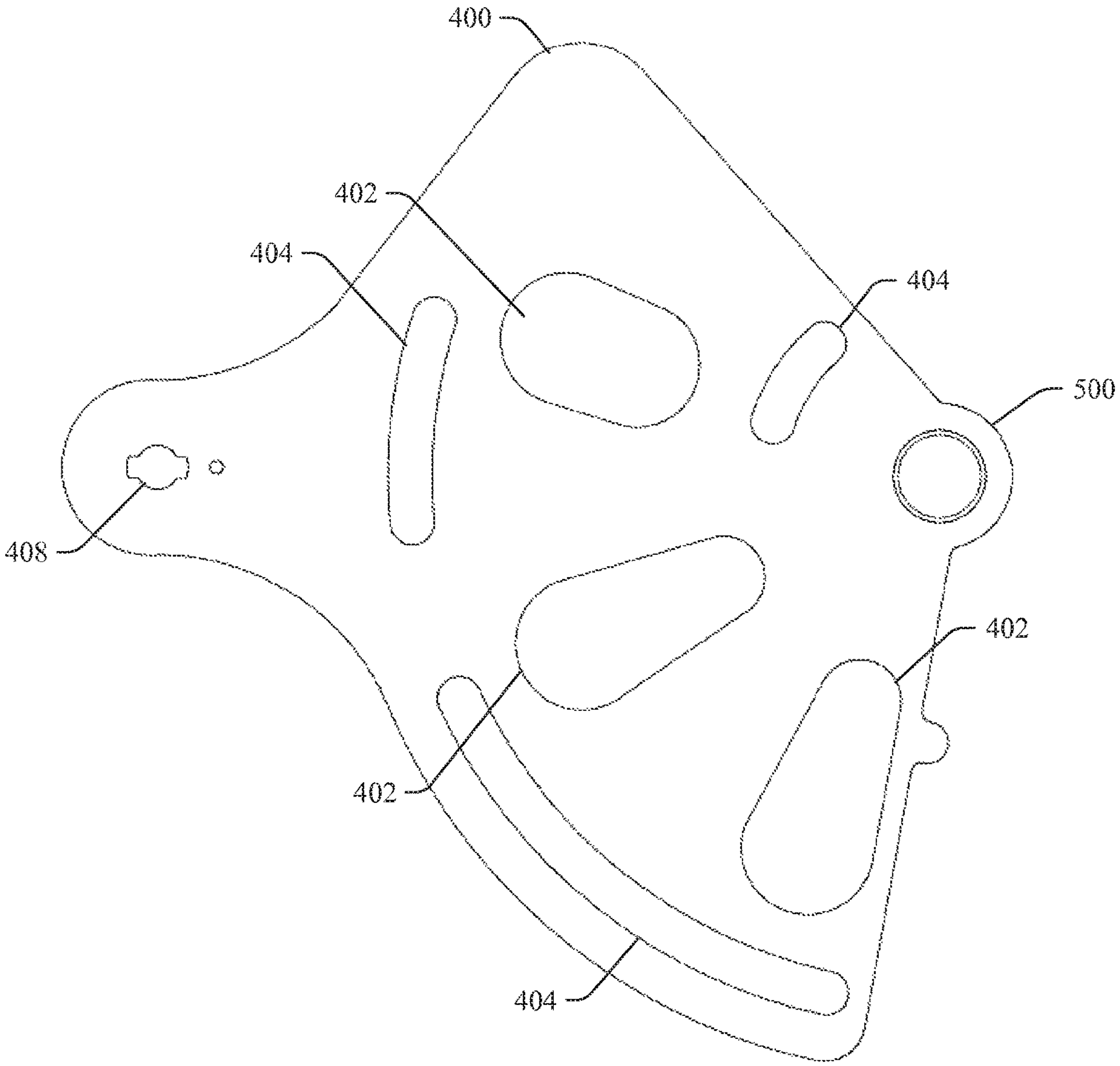
FIG. 20 is a top view of an innovative shut-off adjustment plate in accordance with an aspect of the innovation.
Figure 21:
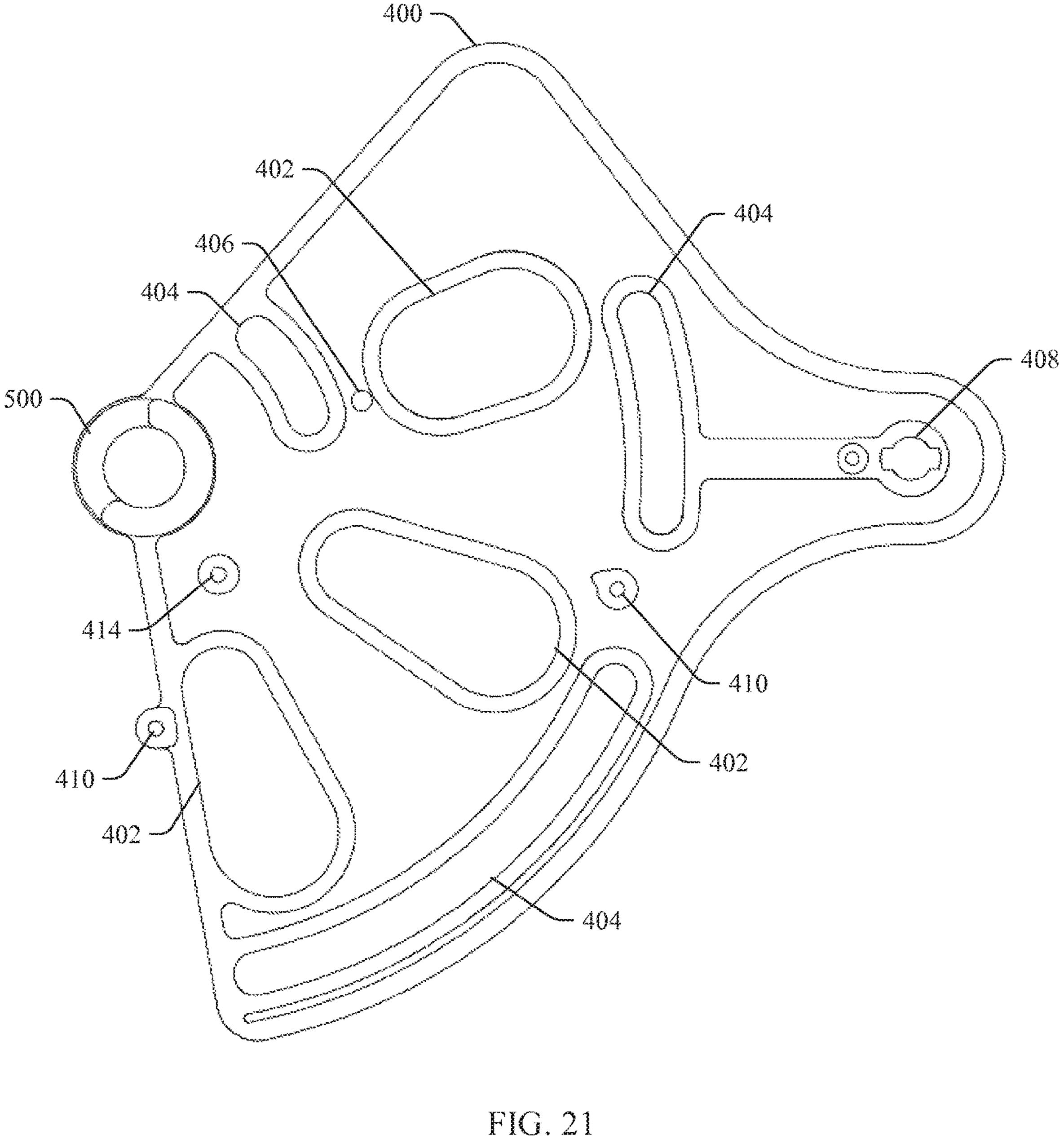
FIG. 21 is a bottom view of the innovative shut-off adjustment plate in accordance with an aspect of the innovation.
Figure 22:
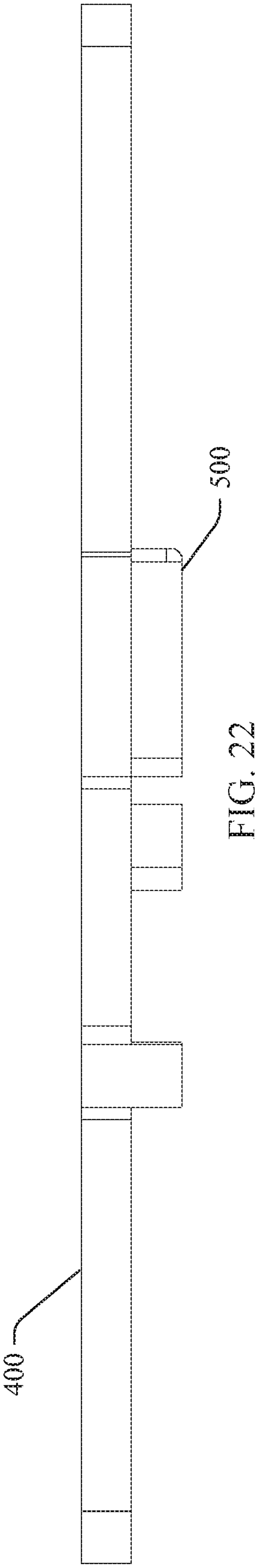
FIG. 22 is a front view of the innovative shut-off adjustment plate in accordance with an aspect of the innovation.
Figure 23:
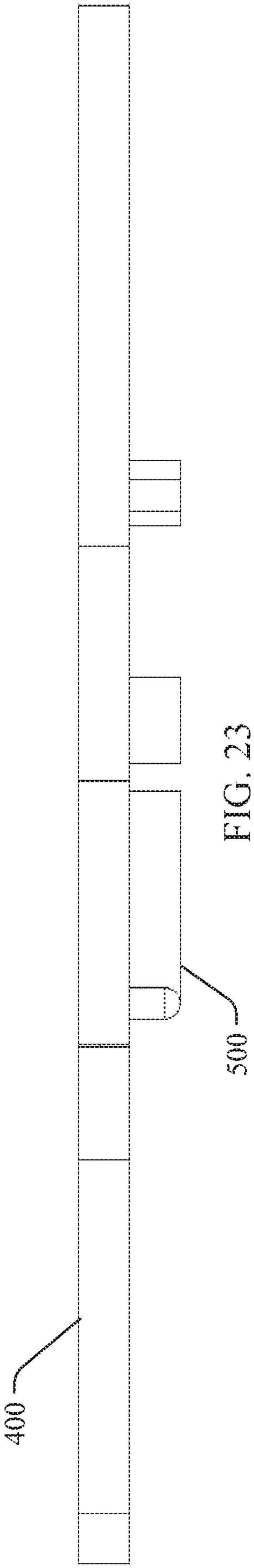
FIG. 23 is a rear view of the innovative shut-off adjustment plate in accordance with an aspect of the innovation.
Figure 24:
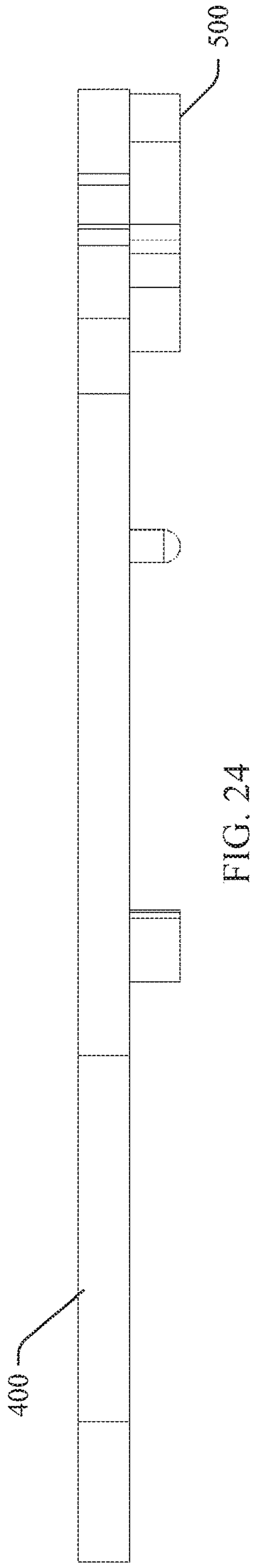
FIG. 24 is a left side view of the innovative shut-off adjustment plate in accordance with an aspect of the innovation.
Figure 25:
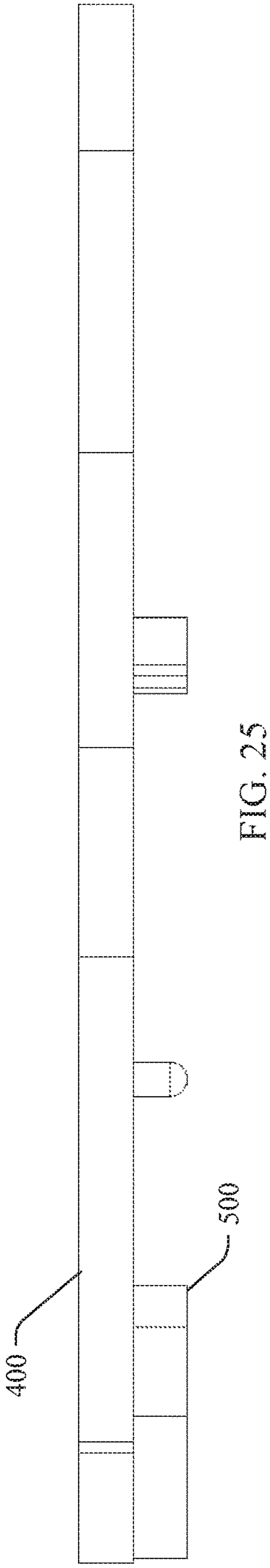
FIG. 25 is a right side view of the innovative shut-off adjustment plate in accordance with an aspect of the innovation.

With reference now to the figures, FIGS. 1A and 1B illustrate example embodiments of a particulate material dispersing apparatus 100A, 100B that incorporates the innovative spread control assembly 200 (shown in FIG. 1A) in accordance with aspects of the innovation. It is to be understood that the particulate material dispersing apparatus 100A, 100B may be any type of particulate dispersing apparatus capable of dispersing particulate and/or granular material (hereinafter "material"), such as but not limited to lawn seed/fertilizer, salt, etc. In addition, the particulate material dispersing apparatus 100A, 100B may be a walk behind type spreader, a hand-held type spreader, a tow-type spreader, etc. The example particulate material dispersing apparatus 100A, 100B illustrated in FIGS. 1A and 1B are walk behind type spreaders and will be used to describe the innovation disclosed herein. Thus, the example particulate material dispersing apparatus 100A, 100B illustrated in FIGS. 1A and 1B are for illustration purposes only and are not intended to limit the scope of the innovation.

Still referring to FIGS. 1A and 1B, the example particulate material dispersing apparatus 100A, 100B, includes a frame 102A, 100B, a vessel or hopper 104A, 104B, mounted to the frame 102A, 102B, a push handle 106A, 106B mounted to the frame 102A, 102B, an open-close/adjustment (shut-off) assembly 108A, 108B, a pair of wheels 110A, 110B, a dispersing mechanism 112A, 112B disposed below the innovative spread control assembly and configured to disperse product from inside the hopper 104A 104B, and a gear box 114A, 114B operatively connecting the wheels 110A, 110B, and the dispersing mechanism 112A, 112B via an axle 116A, 116B, and a gear/impeller shaft 118A (best shown in FIG. 1A).

In the example embodiment illustrated in the figures, the hopper 104A, 104B has a rectangular type shape, as viewed from the top, but it is to be understood that the shape of the hopper 104A, 104B can be any shape, such as but not limited to square, circular, etc. An opening (not shown) is defined in a bottom of the hopper 104A, 104B that facilitates the dispersing of the particulate material in association with the innovative spread control assembly 200.

FIGS. 2-7 illustrate the innovative spread control assembly 200 in a nonactivated (open) state in accordance with an aspect of the innovation. In the nonactivated state, the spread control assembly 200 allows the dispersion of material in all directions, as will be explained further below. FIGS. 8-13 illustrate the spread control assembly 200 in an activated (closed) state in accordance with an aspect of the innovation. In the activated state, the spread control assembly 200 impedes the dispersion of material in one side direction and allows the dispersion of material in an opposite side direction while simultaneously reducing the material flow rate.

Thus, the spread control assembly 200 is configured to alter a material spread pattern of the particulate material dispersing apparatus 100A, 100B. More specifically, the spread control assembly 200, when activated, impedes material from being dispersed through one or more exit openings defined in a shut-off adjustment plate explained further below. Therefore, a reduced amount of material is dispersed through only those remaining exit openings not covered by a spread control mechanism thereby eliminating product overuse and waste.

In addition, activation of the spread control assembly 200 causes the material to be dispersed outward from one side of the particulate material dispersing apparatus 100A, 100B while impeding material from being dispersed out an opposite side of the particulate material dispersing apparatus 100A, 100B. Thus, any material dispersed in the altered-spread pattern is impeded from spreading onto non-lawn areas, such as landscape beds, driveways, walkways, etc. It is to be understood that the spread control assembly 200 can be configured to impede material dispersion from either side of the dispersing apparatus 100A, 100B. Thus in one example embodiment, the material may be dispersed from a first side (e.g., left or right) and impeded from being dispersed from a second side (e.g., right of left). Therefore, the example embodiment described herein and illustrated in the figures is for illustrative purposes only and is not intended to limit the scope of the innovation.

As illustrated in FIGS. 2-13, the innovative spread control assembly 200 includes a spread control mechanism 300, a shut-off adjustment plate 400, and a pivot mechanism 500 that pivotally connects the spread control mechanism 300 and the shutoff adjustment plate 400.

Referring to FIGS. 14-19, in the example embodiment illustrated in the figures, the spread control mechanism 300 includes a handle 302, multiple paddles including a first paddle 304, a second paddle 306, and a curved pivot engagement portion 308. The curved pivot engagement portion 308 facilitates the pivoting motion of the spread control mechanism 300 about the pivot mechanism 500. The spread control mechanism 300 attaches to the shut-off adjustment plate 400 via a fastener 310 that extends through a slot 312 defined in the spread control mechanism 300. The handle 302 connects to an end 314 of the first paddle 304 that is distal from the pivot mechanism 500. The handle 302 facilitates movement of the spread control mechanism 300 between and an activated (closed) and deactivated (open) state. The spread control mechanism 300 has a V-shaped configuration whereby the first and second paddles 304, 306 are spaced to facilitate application of material.

Referring to FIGS. 20-25, the shut-off adjustment plate 400 includes the multiple exit openings 402 defined therein and multiple elongated curved openings 404 that serve as hopper attachments openings whereby the shut-off adjustment plate 400 attaches to an outside bottom of the hopper 104A, 104B. The shut-off adjustment plate 400 further includes a vertically projecting stop mechanism 406, a control rod attachment opening 408, multiple hold down openings 410 (FIG. 21) that receive fasteners 412 that serve to hold down the spread control mechanism 300, and a spread control mechanism guide opening 414 (FIG. 21) that receives the fastener 310 mentioned above.

There are three exit openings 402 defined in the shut-off adjustment plate 400 in the example embodiment illustrated in the figures. It is to be understood, however, that there can be any number of exit openings 402 defined in the exit plate 400. In one example embodiment, the number of exit openings 402 is at least one greater than a number of paddles 304, 306. Thus, when the spread control mechanism 300 is activated all but one exit opening 402 will be covered thereby impeding any material from exiting the covered exit openings 402. Therefore, a reduced amount of material will exit the remaining exit openings 402, which directs the material to exit one side of the particulate material dispersing apparatus 100A, 100B.

When the spread control mechanism 300 is in a non-activated position, as shown in FIGS. 2-7, the spread control mechanism 300 is positioned such that all of the exit openings 402 are uncovered. The spread control mechanism 300 is slidably attached through the curved slot 312 via a washer head screw or other suitable device. Thus, the handle 302 may be grasped and moved, thereby urging the spread control mechanism 300 to be moved or slid along the path defined by slot 312 so as to move the spread control mechanism 300 between the activated (closed) and deactivated (open) state. The vertically projecting stop mechanism 406 impedes the spread control mechanism 300 from pivoting past the associated exit openings 402 intended for selective closure.

The pivot mechanism 500 is circular and is integrated into the shut-off adjustment plate 400. The curved pivot engagement portion 308 of the spread control mechanism 300 engages the pivot mechanism 500 to facilitate pivoting of the spread control mechanism 300 with respect to the shut-off adjustment plate 400. Thus, in order to pivot the spread control mechanism 300, the user pivots or rotates the user pivots or rotates the spread control mechanism 300 about the pivot mechanism 500 to the desired position.

Although, the spread control assembly illustrated in the figures is configured to disperse material out a particular side of the particulate dispersing apparatus, it is to be understood that in an alternate embodiment, the spread control assembly can be configured to disperse particulate material out an opposite side of the particulate dispersing apparatus.

Figure 26:
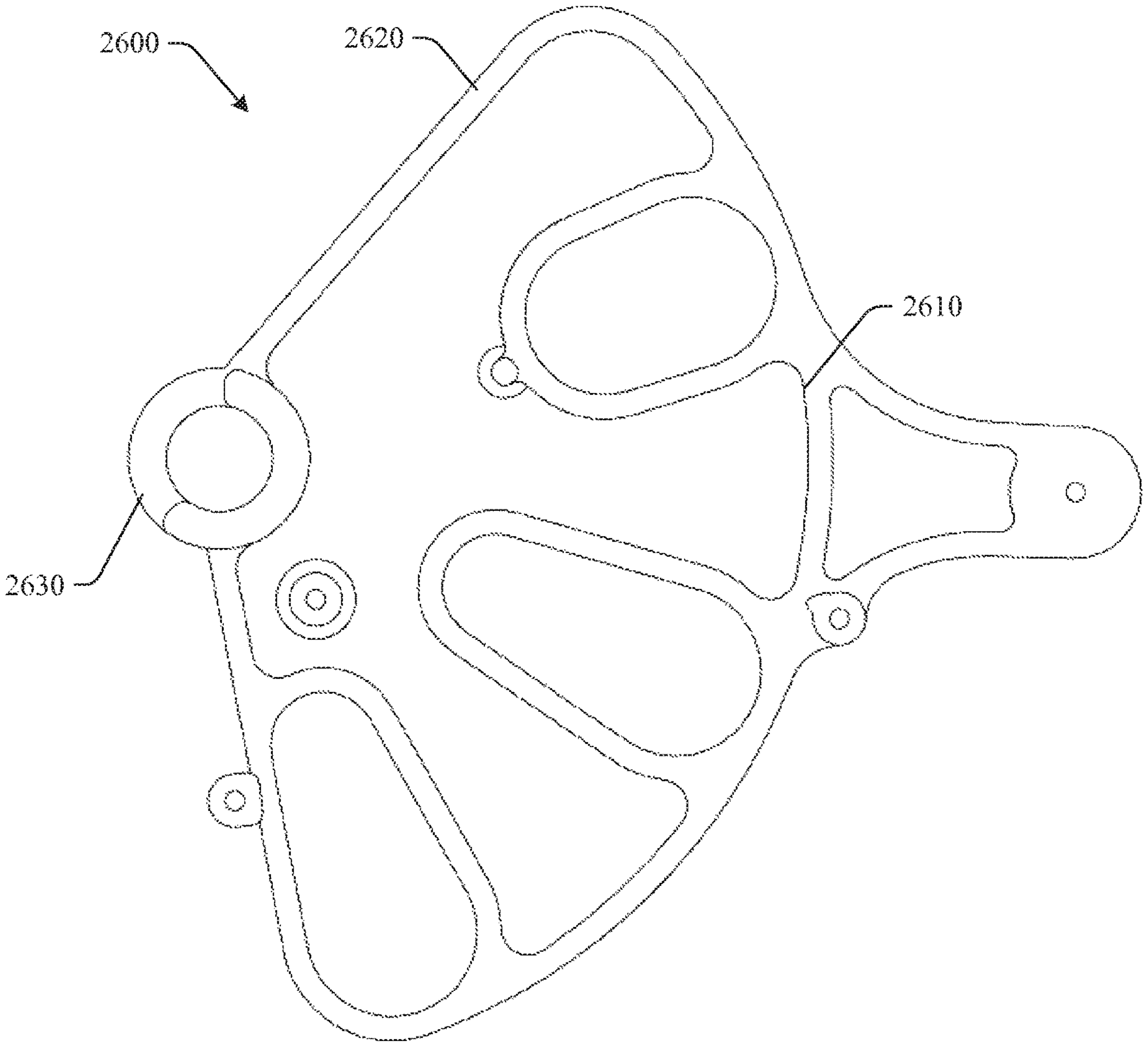
FIG. 26 is another example embodiment of an innovative spread control mechanism in accordance with an aspect of the innovation.

FIG. 26 illustrates an example alternate embodiment of a spread control assembly 2600 similar to the spread control assembly 200 disclosed above in accordance with an aspect of the innovation. The spread control assembly 2600 includes a spread control mechanism 2610, a shut-off adjustment plate 2620, and a pivot mechanism 2630 that pivotally connects the spread control mechanism 2610 and the shut-off adjustment plate 2620. One difference between the spread control assembly 2600 illustrated in FIG. 26 and the spread control assembly 200 illustrated above is that the spread control assembly 2600 does not include the slots 404 defined in the shut-off adjustment plate 400. All other features and functions between the two spread control assemblies 200, 2600 are similar and thus, will not be repeated.

Figure 27:
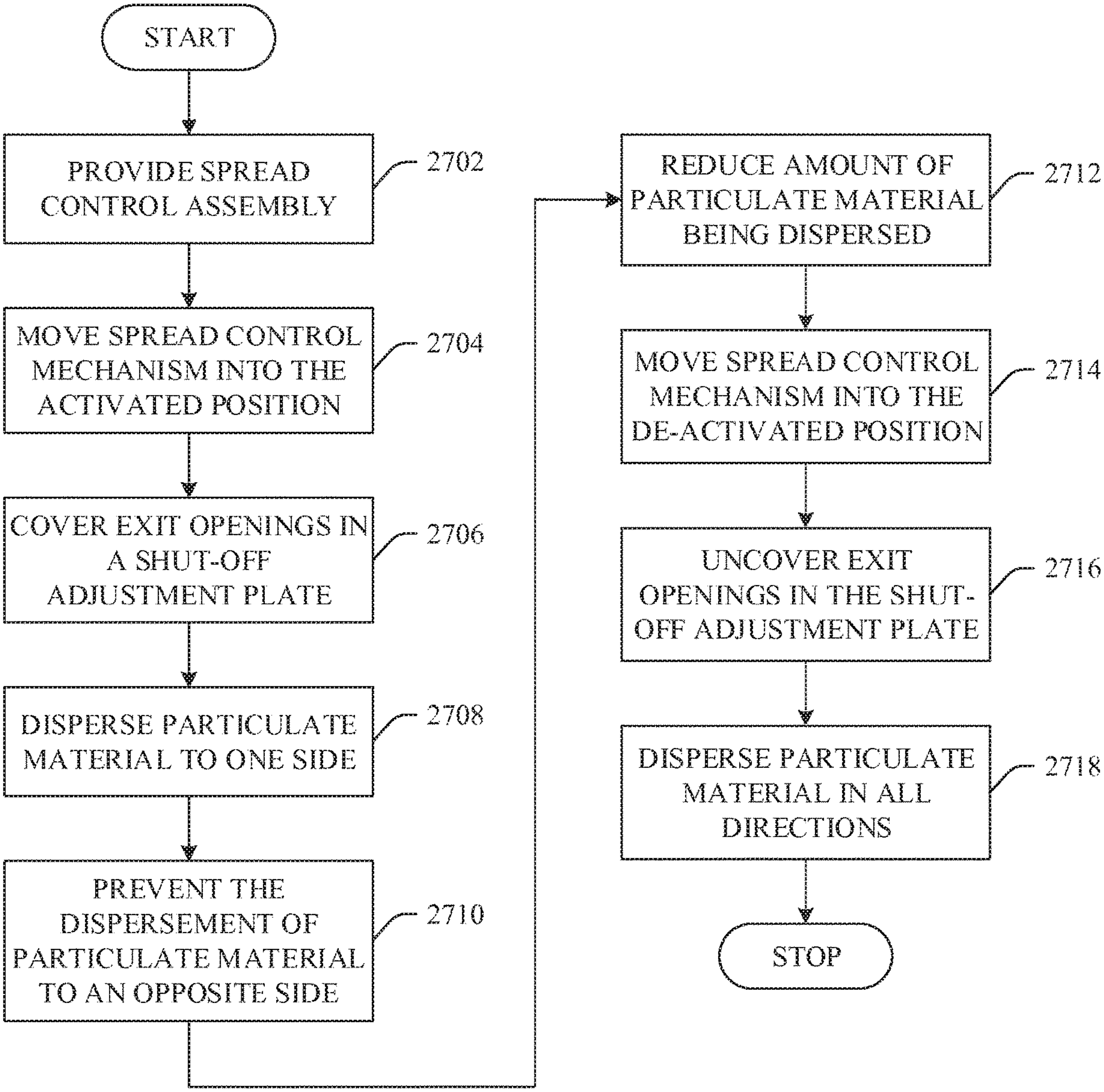
FIG. 27 is a block diagram illustration of a method of dispersing particulate material in accordance with an aspect of the innovation.

Referring to FIG. 27, a process of dispersing particulate material will now be described in relation to the spread control assembly 200 illustrated in FIGS. 2-25 in accordance with one aspect of the innovation. At 2702, a spread control assembly 200 in a non-activated state for a particulate material dispersing apparatus is provided. At 2704, a spread control mechanism 300 is moved via the handle 302 in a direction such that the spread control assembly 200 is in an activated state. At 2706, the paddles 304, 306 cover exit openings 402 defined in the shut-off adjustment plate 400 thereby impeding particulate material from be dispersed through the covered exit openings 402. At 2708, particulate material is dispersed in a direction that corresponds to the side opposite the covered exit openings 402. Simultaneously, at 2710, particulate material is impeded from being dispersed in a direction that corresponds to the side of the covered exit openings 402. Simultaneously at 2712, an amount of dispersed particulate material is reduced thereby minimizing particulate material waste. At 2714, the spread control mechanism 300 is moved in a direction such that the spread control assembly 200 is in a de-activated position. At 2716, the paddles 304, 306 are moved such that the exit openings 402 are uncovered. At 2718, particulate material is dispersed in all directions. The process is repeated as the need arises to impede the dispersing of particulate material in a particular direction so as to impede the dispensing of particulate material on unwanted surfaces, such as driveways, walkways, landscape beds, etc.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An adaptable walk behind spreader for dispersing particulate material in different spread patterns, the walk behind spreader comprising:

a frame;

a push handle mounted to the frame;

a pair of wheels mounted to the frame;

a hopper mounted to the frame and configured to hold particulate material;

a plurality of exit openings including first, second and third exit openings through which particulate material held in the hopper can selectively pass;

a spread control assembly disposed below the hopper and configured to control flow of the particulate material through the first, second and third exit openings; and a dispersing mechanism disposed below the spread control assembly and configured to disperse particulate material passing through the spread control assembly, wherein the spread control assembly comprises a spread control mechanism that is movable between a deactivated position where none of the first, second and third exit openings are covered by the spread control mechanism and an activated position where two of the first, second and third exit openings are covered by the spread control mechanism and one of the first, second and third exit openings is not covered by the spread control mechanism, wherein the adaptable spreader disperses particulate material in an unaltered spread pattern when the spread control mechanism is in the deactivated position and in an altered spread pattern when the spread control mechanism is in the activated position, wherein the unaltered spread pattern disperses particulate material to first and second opposite sides of the spreader, wherein the altered spread pattern impedes dispersion of particulate material to the first side of the spreader and disperses the particulate material to the second side of the spreader, wherein the dispersing mechanism rotates on an axis of rotation, wherein all of the plurality of exit openings are positioned on one side of a plane that is coextensive with the axis of rotation.

2. The walk behind spreader of claim 1, wherein the spread control mechanism is slidable between the deactivated and activated positions.

3. The walk behind spreader of claim 1, wherein the spread control mechanism is pivotable between the deactivated and activated positions.

4. The walk behind spreader of claim 1, wherein the spread control assembly comprises a plate located below the hopper and defining the first, second and third exit openings.

5. The walk behind spreader of claim 4, wherein the plate is moveable relative to the hopper, wherein the spread control mechanism is movable relative to the plate during moving of the spread control mechanism between the activated and deactivated positions.

6. The walk behind spreader of claim 1, wherein each of the first, second and third exit openings is elongated in a direction that is transverse to the direction of movement of the spread control mechanism between the activated and deactivated positions.

7. The walk behind spreader of claim 1, wherein when the spread control mechanism is in the activated position, the two covered exit openings are the two exit openings closest to the first side of the spreader and the one uncovered exit opening is the exit opening closest to the second side of the spreader.

8. The walk behind spreader of claim 1, wherein the spread control assembly further comprises a shut-off adjustment plate moveable between a fully open position and a fully closed position, wherein when the shut-off adjustment plate is in the fully closed position at least one of the exit openings is covered to prevent passage of the particulate material therethrough.

9. The walk behind spreader of claim 8, wherein the shut-off adjustment plate has at least one opening formed therein.

10. The walk behind spreader of claim 1, wherein the first, second and third exit openings are not evenly positioned around the axis of rotation.

11. The walk behind spreader of claim 1, wherein none of the plurality of exit openings are positioned forward of the axis of rotation.

12. The walk behind spreader of claim 1, further comprising an axle extending between the wheels and below the dispersing mechanism, wherein the first, second and third all three exit openings are positioned rearward of the axle.

13. The walk behind spreader of claim 1, wherein at least one of the exit openings is differently shaped than at least one other of the exit openings.

14. The walk behind spreader of claim 1, wherein at least one of the exit openings is non-circular.

15. The walk behind spreader of claim 1, wherein each of the first, second and third exit openings is non-circular.

16. The walk behind spreader of claim 1, wherein each of the first, second and third exit openings has an elongated shape.

17. The walk behind spreader of claim 16, wherein at least one of the exit openings is differently shaped than at least one other of the exit openings.

18. The walk behind spreader of claim 16, wherein each of the first, second and third exit openings is elongated in a radial direction relative to the axis of rotation.

19. An adaptable walk behind spreader for dispersing particulate material in different spread patterns, the walk behind spreader comprising:

a frame;

a push handle mounted to the frame;

a pair of wheels mounted to the frame;

a hopper mounted to the frame and configured to hold particulate material;

a shut-off adjustment plate attached to an outside bottom of the hopper and defining a plurality of exit openings including first, second and third exit openings;

a first paddle attached to the shut-off adjustment plate and movable relative to the shut-off adjustment plate between a first deactivated position where the first exit opening is not covered by the first paddle and a first activated position where the first exit opening is covered by the first paddle, wherein the first paddle comprises a handle for facilitating movement of the first paddle between the deactivated and activated positions; and a dispersing mechanism disposed below the shut-off adjustment plate and the first paddle and configured to disperse particulate material passing through the first, second and third exit openings, wherein movement of the first paddle from the deactivate position to the activated position alters the spread pattern of the particulate material dispersed from the spreader, wherein the dispersing mechanism rotates on an axis of rotation, wherein all of the plurality of exit openings are positioned on one side of a plane that is coextensive with the axis of rotation.

20. The walk behind spreader of claim 19, wherein the first paddle slides between the first deactivated position and the first activated position.

21. The walk behind spreader of claim 19, wherein the first paddle pivots between the first deactivated position and the first activated position.

22. The walk behind spreader of claim 19, further comprising a second paddle attached to the shut-off adjustment plate and movable relative to the shut-off adjustment plate between a second deactivated position where the second exit opening is not covered by the second paddle and a second activated position where the second exit opening is covered by the second paddle.

23. The walk behind spreader of claim 22, wherein the first and second paddles are connected and move together relative to the shut-off adjustment plate.

24. The walk behind spreader of claim 19, wherein the handle is an extended portion of the first paddle and has an ergonomic contour for gripping.

25. An adaptable walk behind spreader for dispersing particulate material in different spread patterns, the walk behind spreader comprising:

a frame;

a push handle mounted to the frame;

a pair of wheels mounted to the frame;

a hopper mounted to the frame and configured to hold particulate material;

a plurality of exit openings including first, second and third exit openings through which particulate material held in the hopper can selectively pass;

a spread control assembly disposed below the hopper and configured to control flow of the particulate material through the first, second and third exit openings; and a dispersing mechanism disposed below the spread control assembly and configured to disperse particulate material passing through the spread control assembly, wherein the spread control assembly comprises a first spread control member and a second spread control member, wherein the first spread control member is moveable between a fully open position where at least one of the first, second and third exit openings is not covered by the first spread control member and a fully closed position where at least one of the first, second and third exit openings is covered by the first spread control member, wherein the second spread control member is moveable relative to the first spread control member between a deactivated position where none of the first, second and third exit openings are covered by the second spread control member and an activated position where at least one of the first, second and third exit openings is covered by the second spread control member and at least one of the first, second and third exit openings is not covered by the second spread control member, wherein the spreader disperses particulate material in an unaltered spread pattern when the second spread control member is in the deactivated position and in an altered spread pattern when the second spread control member is in the activated position, wherein the unaltered spread pattern disperses the particulate material to first and second opposite sides of the spreader, wherein the altered spread pattern impedes dispersion of the particulate material to the first side of the spreader and disperses the particulate material to the second side of the spreader, wherein the walk behind spreader includes only three of the exit openings wherein the dispersing mechanism rotates on an axis of rotation, wherein all of the plurality of exit openings are positioned on one side of a plane that is coextensive with the axis of rotation.

26. The walk behind spreader of claim 25, wherein the first spread control member is a shut-off adjustment plate defining the first, second and third exit openings.

27. The walk behind spreader of claim 25, wherein the first spread control member is rotatable relative to the hopper between the fully open and fully closed positions.

28. The walk behind spreader of claim 25, wherein the second spread control member is located below the first spread control member.

29. The walk behind spreader of claim 25, wherein the second spread control member is rotatable relative to the first spread control member between the activated and deactivated positions.

30. The walk behind spreader of claim 25, wherein when the second spread control member is in the activated position two of the first, second and third exit openings are covered by the second spread control member and one of the first, second and third exit openings is not covered by the second spread control member.

31. The walk behind spreader of claim 25, wherein at least a portion of each of the first, second and third exit openings is positioned rearward of the axis of rotation.

* * * * *